Figure 1:
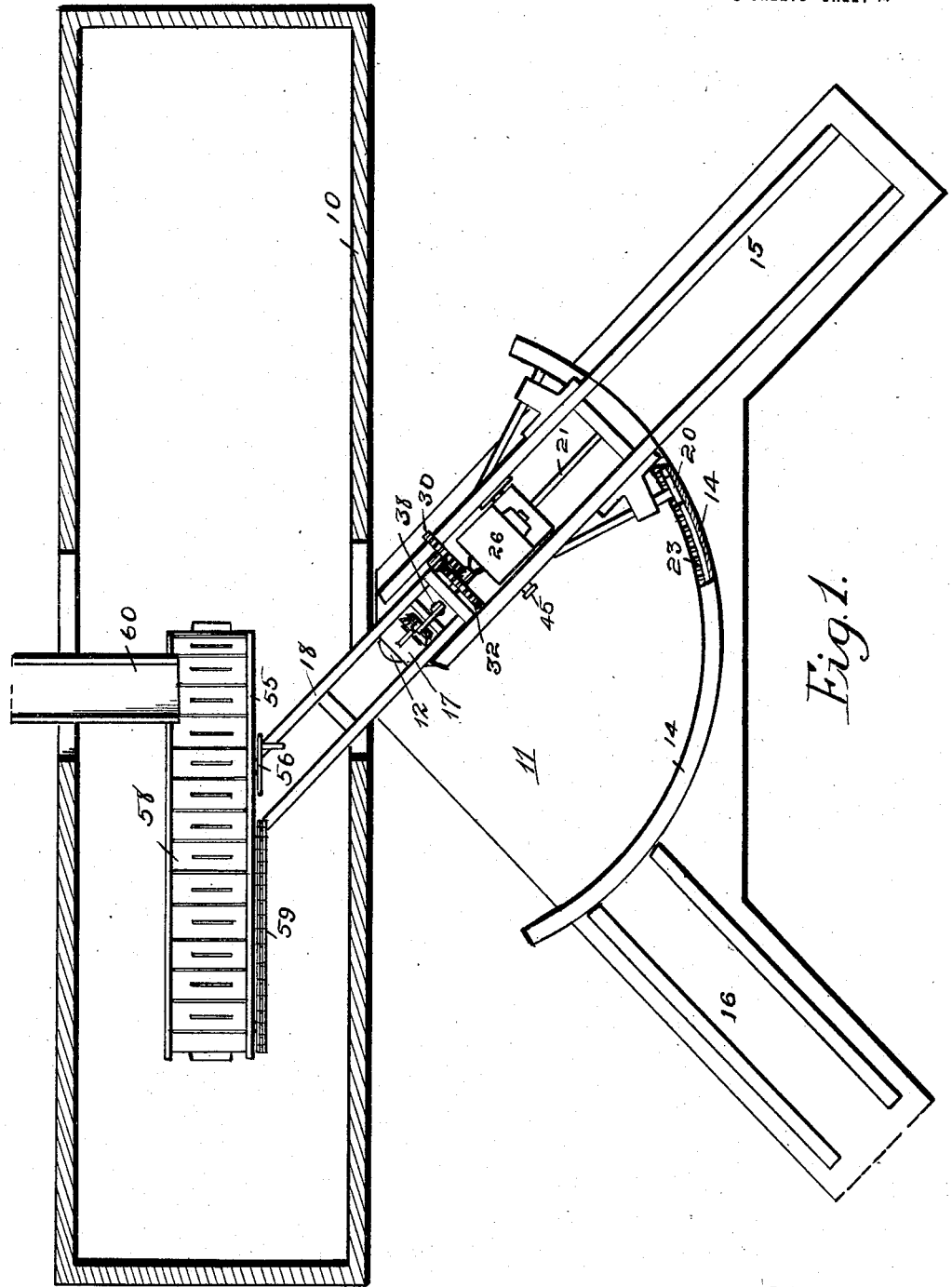

J. M. CHRISTY.
BOX CAR LOADER.
APPLICATION FILED AUG. 21, 1912.

1,186,882.

Patented June 13, 1916.
3 SHEETS—SHEET 1.

Witnesses
A. G. Hague
L. C. Paley

Inventor
Joseph M. Christy
by Orwig & Bair attys

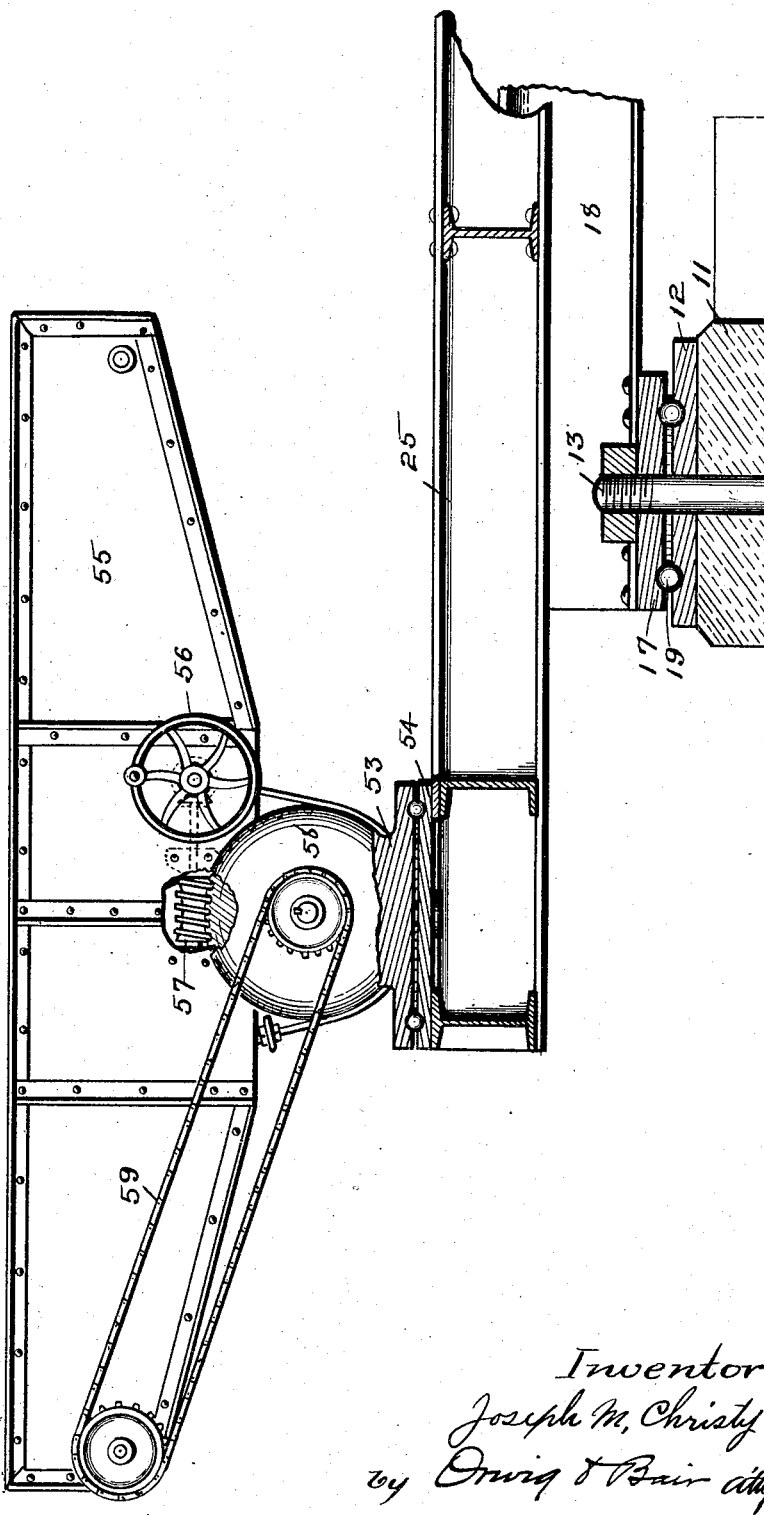

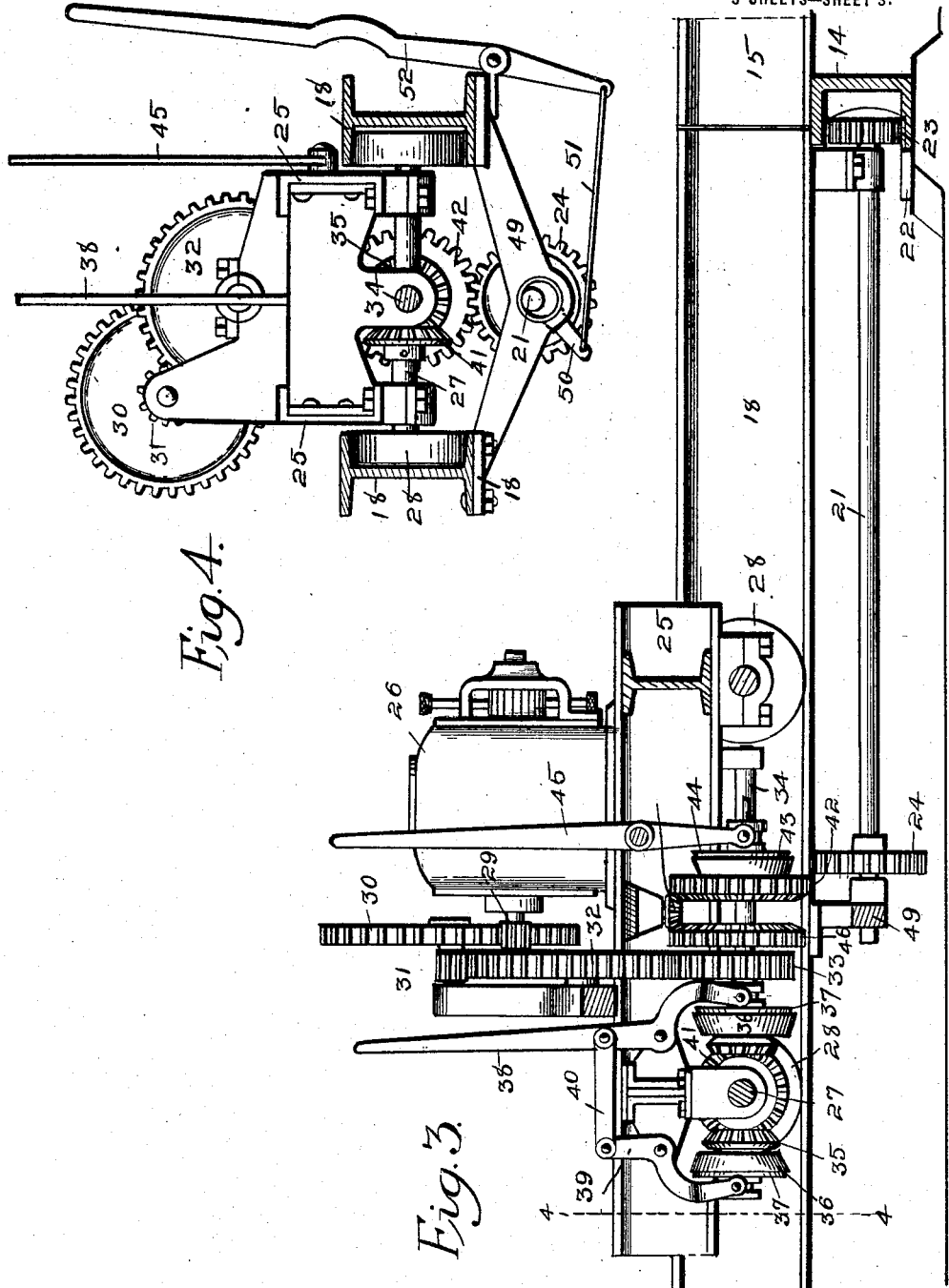

UNITED STATES PATENT OFFICE.

JOSEPH M. CHRISTY, OF DES MOINES, IOWA.

BOX-CAR LOADER.

1,186,882.  Specification of Letters Patent.  Patented June 13, 1916.

Application filed August 21, 1912. Serial No. 717,206.

*To all whom it may concern:*

Be it known that I, JOSEPH M. CHRISTY, a citizen of the United States, residing at Des Moines, in the county of Polk and State of Iowa, have invented a certain new and useful Box-Car Loader, of which the following is a specification.

My invention belongs to that type of box car loader particularly designed for loading coal into box cars and in which the loader proper consists of a conveyer into which the coal is received from the chute and which then carries the coal toward the ends of the box car, the loader proper being mounted upon a truck, which truck is capable of movement into and out of the box car through one of the side door openings thereof. In devices of this kind, the loader proper with the conveyer thereon must be of relatively great length in order to convey the material from the supply chute at the center of the box car to the desired point near the end of the box car, and when this is done, there is considerable difficulty in inserting or removing the loader proper into or from the interior of the box car, on account of the fact that the width of the side door opening is limited and the width of the car is also limited.

The object of my invention is to provide a box car loader of simple, durable and inexpensive construction, so arranged that the loader frame having the conveyer thereon may be inserted through the side door opening of the box car diagonally and then swung to position longitudinally of the car on the interior thereof, so that a relatively long loader frame may be used and may be inserted in and removed from a box car very quickly and easily.

More specifically it is my object to provide a movable truck for box car loaders and a track and guide device for the truck, so arranged that the end of the truck containing the loader may be inserted through the side door of the box car diagonally and then the truck containing the loader may be moved through a segment of a circle, to thereby move the loader frame from a point near one end of the car to a point near the other end thereof, to provide for continuously receiving material on top of the loader conveyer and for directing said material to any desired part of the interior of the box car without throwing the material to any considerable distance beyond the end of the loader conveyer.

My invention consists in the construction, arrangement and combination, with a movable truck and a loader thereon, of means for pivotally supporting the movable truck so that the loader may be inserted into or removed from a box car diagonally and whereby the other objects contemplated are attained, as hereinafter more fully set forth, pointed out in my claims, and illustrated in the accompanying drawings, in which—

Figure 1 shows a top or plan view of the box car loader embodying my invention, the loader frame being shown within a box car, the latter being illustrated in horizontal section. Fig. 2 shows a side elevation of a loader frame and part of the movable truck on which the loader frame is pivoted and a part of the rotatable platform which supports the movable truck, portions of the truck and platform being illustrated in section. Fig. 3 shows a detail, sectional view illustrating a part of the rotatable platform, a motor thereon and a means for driving the truck longitudinally and also the means for rotating the truck platform, and Fig. 4 shows a sectional view on the line 4—4 of Fig. 3.

Referring to the accompanying drawings, I have used the reference numeral 10 to indicate a box car. Arranged at the side of the track on which the box car is mounted is a stationary platform 11 having thereon, at a point adjacent to the box car, a turn table member 12 through which a vertically arranged bolt 13 is extended. A stationary, segmental guide rail 14 is arranged on the stationary platform 11 concentric to the turn table 12. At opposite end portions of this segmental stationary guide rail 14 are two tracks 15 and 16 shown in Fig. 1.

Mounted upon the stationary turn table member 12 is a rotary turn table member 17, having a segmental turn table 18 mounted thereon. The turn table members 12 and 17 are preferably provided with bearing balls 19. The rotatable platform 18 comprises two track members composed of channel bars in which the supporting wheels of the movable truck, hereinafter described, are mounted for longitudinal movement and the tracks 15 and 16 are also made of the same size and kind of channel bar. On each side of the pivoted platform 18 is a guide roller 20 to run in the segmental guide rail 14 and to thereby support the outer end of the pivoted platform 18.

The pivoted platform 18 is provided with a longitudinal shaft 21 having a pinion 22 on its outer end, which pinion meshes with the rack 23 on the segmental guide rail 14, as shown in Figs. 1 and 3, so that a rotation of the shaft 21 will cause the pivoted platform 18 to be rotated. Fixed to the shaft 21 is a pinion 24, which pinion may be driven from an electric motor or other source of power carried by the movable truck.

The movable truck is indicated generally by the reference numeral 25 and is provided on its outer end portion with an electric motor 26 or other suitable source of power, and is also provided with a rotatable axle 27 on which are the supporting wheels 28 which run in the channel bars of the pivoted platform 18, as shown in Fig. 4.

I have provided for rotating the axle 27 as desired by the power for the motor 26 as follows: On the motor shaft is a pinion 29 in mesh with a large cog wheel 30 on the truck frame. The cog wheel 30 is connected to a pinion 31 and is in mesh with a large cog wheel 32 on the truck frame. This cog wheel 32 is in mesh with a smaller cog wheel 33 which is fixed to the longitudinal shaft 34. On the longitudinal shaft 34 are two beveled pinions 35 each of which is rotatably mounted, and said beveled pinions 35 are on opposite sides of the shaft 27. Connected with each of the beveled pinions 35 is a friction clutch member 36 designed to coact with a mating friction clutch member 37 slidably mounted on the shaft 34. The two sliding clutch members are connected with each other by the levers 38 and 39 and the link 40 so that when one clutch member is in operative position, the other will be disengaged. Fixed to the shaft 27 is a beveled pinion 41 in mesh with both of the pinions 35. Hence, by a manipulation of the lever 38, the axle 27 may be caused to rotate in either direction, to thereby move the truck longitudinally of the pivoted platform 18 or of the tracks 15 and 16.

When the movable truck is in a certain position of its movement, as for instance, when in the position shown in Fig. 1, it may be desirable to move the pivoted platform from one limit of its movement to the other, and for this purpose, I have provided the following mechanism: Loosely mounted upon the shaft 34 is a cog wheel 42 connected with a friction clutch member 43, which coacts with a friction clutch member 44 slidingly mounted on the shaft 34 and controlled by the lever 45. The pinion 24 that is fixed to the shaft 21 is so positioned that when the truck is in the position shown in Fig. 1, the two pinions 24 and 42 will be in mesh, whereupon, by a manipulation of the lever 45, the shaft 21 may be rotated to move the pivoted platform to any position of its adjustment.

In order to provide for a movement of the pivoted platform 18 in the opposite direction, I have fixed to the shaft 34 a cog wheel 46 adjacent to the cog wheel 42. Both the cog wheels 42 and 46 are provided with beveled teeth 47 on their adjacent edges and between the beveled teeth 47 is a beveled pinion 48 suitably supported and designed to impart to the cog wheel 46 a reverse movement relative to the cog wheel 42. In this connection and in order to provide for the convenient engagement of the pinion 24 with the cog wheels 42 and 46, I preferably mount the inner end of the shaft 21 upon an eccentric 49 connected to a lever 50, which lever 50 is connected by a link 51 to a lever 52 fulcrumed to the side of the pivoted platform 18 as shown in Fig. 4. By this arrangement, the operator may first move the truck to position with either one of the wheels 42 or 46 directly above the wheel 24, then by a manipulation of the lever 52, the wheel 24 may be thrown into mesh with either one of said cog wheels and then the lever 45 may be manipulated to rotate the shaft 21 in the desired direction.

For convenience in description, I have termed the end of the truck 25, that is designed to enter the box car, as the "inner" end.

Rotatably mounted on the inner end of the truck 25 is a turn table member 53 supported on a stationary turn table member 54, and tiltingly mounted on the turn table member 53 is the loader frame 55. The loader frame may be tilted by means of a hand wheel 56 operating through a worm gear 57, and carried by the rotary turn table member 53 is an electric motor 58 which motor is designed to drive the endless conveyer 58 on the loader frame from the sprocket gearing 59. The particular construction of the loader frame and its supporting and tilting means form no part of my present invention, and have been fully illustrated and described in my Patent No. 648,897, issued May 1, 1900, on a box car loader.

The reference numeral 60 indicates the chute through which material may be run into a box car and upon the loader conveyer from the side opposite the roller platform.

It is desirable in a device of this kind to have the loader frame extend into the interior of the box car a considerable distance from the side door openings. In some instances, a truck frame has been extended straight into the interior of a box car and then the loader frame moved longitudinally of the box car relative to the truck which supports it, as for instance, in Patent No. 648,897, issued to me on May 1, 1900, for a box car loader. There are, however, some structural difficulties in connection with a device of this kind which have been overcome in my present construction.

Some of the advantages of my invention are that by running the truck out of a box car diagonally, the platform on which the truck is supported will not occupy so much space at the side of the truck as would be necessary if the truck frame ran out of a box car at right angles to the track on which the box car is supported.

By running the loader frame and truck diagonally through the car door openings, a much longer loader frame may be utilized than is possible where the loader frame runs into the box car at right angles to the longitudinal axis thereof, and then must be turned around inside of the car. Furthermore, by having the inner end of the truck frame capable of swinging through a segment of a circle, the central portion of the loader frame may be moved longitudinally within a box car a distance of four or five feet without sliding the loader frame relative to the truck. Hence, by the use of a relatively long loader frame, which is made possible in a structure of this kind, and by this longitudinal movement of the inner end of the truck frame, I am enabled to load material close to the ends of a box car without the necessity of sliding the loader conveyer relative to the inner end of the truck. Hence, the parts may be made very strong and durable and the device may be run into and out of a box car very readily and easily without danger of injuring the box car.

I am aware that in the prior art it has been customary to provide an apparatus for loading box cars which consisted of a track, a conveyer, a supporting truck upon this track capable of being projected into and out of a box car, and a pivoted conveyer frame on the end of the conveyer supporting truck. I am also aware that in some instances this element referred to as a track has been pivoted. I have, however, effected a new combination including these elements and have thereby produced a result not attainable by any of the prior art devices. This new element in the combination consists in the pivoting of the track at one end at a point which will be adjacent to the side of the box car being loaded, so that the entire track with the conveyer supporting truck on it, may swing in a horizontal plane about that end of the track that is adjacent to the box car being loaded. This new element in the combination produces a new and very advantageous result which has not heretofore been attained. This new result may be stated as follows: It is to be understood that the position of the box car with reference to the track that is pivoted at one end, is necessarily fixed, because of the fact that the coal chute must be introduced through the door of the box car at the side opposite from the loader. Furthermore the length of the elevator frame is necessarily limited by reason of the limited and fixed size of the box cars to be loaded with regard to the width of said cars and to the width of the door openings. There is, therefore, a fixed length beyond which the length of the loader frame cannot be extended. It is furthermore, desirable to extend a delivery end of the conveyer frame to a considerable distance within the box car and adjacent to the end thereof. In certain prior art devices this extending of the loader frame to a point near the end of the car to be loaded has been effected by sliding the loader frame longitudinally upon the truck which supports the loader frame. This is objectionable in that it involves additional expense in the construction, and makes the parts more complicated and more likely to get out of order.

By my improved construction the truck which carries the conveyer frame is projected diagonally through the car door and the conveyer frame is pivoted only at its center to the end of this truck and is not slidable, but by reason of the truck being extended diagonally into the box car, as shown in Fig. 1, the delivery end of the conveyer frame is projected a considerable distance toward the end of the box car, thus gaining all the advantages of a longitudinally slidable conveyer frame and at the same time combining all the simplicity, strength and durability of the conveyer frames that are simply pivoted at their center to the supporting truck.

Another advantage gained by the new combination is that the pivoted track itself need not be expensive and complicated because when the truck is moved out over the track to a point fully extended out of the box car, its upper end rests upon the stationary track so that there is no excessive strain upon the truck when in any of its positions such as would be the case if the pivotal point of the track had to carry all of the weight of the conveyer supporting truck in all of its positions.

I claim as my invention:

1. In a box car loader, the combination of a track pivoted at one end and capable of swinging in a horizontal plane, said track being so arranged that the pivoted end thereof may be placed adjacent to the side door opening of a box car and the track may be swung through a relatively wide angle without materially affecting the relative position of the pivoted end to the car door opening, a conveyer supporting truck mounted for longitudinal movement on said track, and a conveyer pivotally supported on one end of the truck, said parts being so arranged and proportioned that the end of the truck containing the conveyer may be projected through the side door opening of the car in a direction extending diagonally of the car toward one end thereof, and then the said truck with its conveyer and the track may be moved through an angle approximating ninety degrees to thereby extend the conveyer to a position adjacent to the opposite end of the box car being loaded, without moving the box car and without sliding the conveyer on its truck.

2. In a device of the class described, a combination of a track section pivotally supported to swing in a horizontal plane, two stationary track sections in position to be in line with the pivoted track section at different positions of the movement of the pivoted track section, a truck capable of movement on said track and a loader frame having a conveyer therein pivotally mounted on said truck.

3. In a device of the class described, a combination of a track section pivotally supported to swing in a horizontal plane, two stationary track sections in position to be in line with the pivoted track section at different positions of the movement of the pivoted track section, a truck capable of movement on said tracks and a loader frame having a conveyer therein pivotally mounted on said truck and means carried by the truck for moving it longitudinally on the tracks.

4. In a device of the class described, a combination of a track section pivotally supported to swing in a horizontal plane, two stationary track sections in position to be in line with the pivoted track section at different positions of the movement of the pivoted track section, a truck capable of movement on said tracks, a loader frame having a conveyer therein pivotally mounted on said truck, and means carried by the truck for swinging it horizontally upon its pivot.

5. In a device of the class described, a combination of a track section pivotally supported to swing in a horizontal plane, two stationary track sections in position to be in line with the pivoted track section at different positions of the movement of the pivoted track section, a truck capable of movement on said tracks, a loader frame having a conveyer therein pivotally mounted on said truck, a prime mover carried by the truck, means operated by said prime mover for moving the truck longitudinally on the tracks and means operated by said prime mover for moving the truck upon its pivot.

6. In a device of the class described, a combination of two track sections arranged on divergent angles and spaced apart, a pivoted track section capable of being moved into position in line with either of the other track sections, a truck mounted upon the movable track section, a prime mover carried by the truck, a segmental guide having cog teeth therein, a pinion carried by the movable track section and in mesh with said cog teeth, means for operatively connecting the prime mover with said pinion, a loader frame mounted on said truck and a conveyer on the loader frame.

7. In a device of the class described, a combination of two track sections arranged on divergent angles and spaced apart, a pivoted track section capable of being moved into position in line with either of the other track sections, a truck mounted upon the movable track section, a prime mover carried by the truck, a segmental guide having cog teeth therein, a pinion carried by the movable track section and in mesh with said cog teeth, means for operatively connecting the prime mover with said pinion, a loader frame mounted on said truck, a conveyer on the loader frame and guide wheels carried by the movable track section to engage said segmental guide to prevent tilting movements thereof.

JOSEPH M. CHRISTY.

Witnesses:
S. ROBINSON,
W. A. LOFTUS.

Copies of this patent may be obtained for five cents each, by addressing the "Commissioner of Patents, Washington, D. C."